United States Patent
Lukavec

(10) Patent No.: US 6,953,173 B2
(45) Date of Patent: Oct. 11, 2005

(54) AUTOMATIC RELEASING DEVICE FOR A PARACHUTE

(76) Inventor: Jan Lukavec, Na Krivce 1319/94, 101 00 Praha (CZ)

(*) Notice: Subject to any disclaimer, the term of this patent is extended or adjusted under 35 U.S.C. 154(b) by 0 days.

(21) Appl. No.: 10/488,756
(22) PCT Filed: Mar. 5, 2003
(86) PCT No.: PCT/CZ03/00015
§ 371 (c)(1), (2), (4) Date: Mar. 9, 2004
(87) PCT Pub. No.: WO03/095305
PCT Pub. Date: Nov. 20, 2003

(65) Prior Publication Data
US 2005/0067533 A1 Mar. 31, 2005

(30) Foreign Application Priority Data
May 14, 2002 (CZ) .......................... 2002-13120

(51) Int. Cl.[7] .............................................. B64D 17/52
(52) U.S. Cl. ....................................................... 244/149
(58) Field of Search ................................. 244/147, 148, 244/149, 150

(56) References Cited

U.S. PATENT DOCUMENTS

| | | | |
|---|---|---|---|
| 2,525,608 A | * 1/1950 | Kuntz | 244/142 |
| 2,497,772 A | 2/1950 | Horning | |
| 2,937,831 A | * 2/1950 | Browning et al. | 244/149 |
| 2,926,565 A | * 3/1960 | Thorness | 244/149 |
| 3,023,498 A | 3/1962 | Temple et al. | |
| 3,041,021 A | * 6/1962 | Jaffe | 244/149 |
| 3,142,958 A | 8/1964 | Roberts et al. | |
| 3,300,606 A | 1/1967 | Starer et al. | |
| 3,547,383 A | * 12/1970 | Carpenter | 244/149 |
| 3,690,605 A | * 9/1972 | Jones | 244/149 |
| 3,813,066 A | * 5/1974 | Raznov | 244/150 |
| 3,820,748 A | 6/1974 | McDonald | |
| 3,862,731 A | * 1/1975 | McIntyre | 244/141 |
| 4,227,663 A | * 10/1980 | Ramsey et al. | 244/149 |
| 4,527,758 A | 7/1985 | Ayoub et al. | |
| 4,792,903 A | 12/1988 | Peck et al. | |
| 4,858,856 A | * 8/1989 | Cloth | 244/149 |
| 5,024,400 A | 6/1991 | Cloth | |
| 5,232,184 A | * 8/1993 | Reuter | 244/147 |
| 5,398,891 A | * 3/1995 | Azim et al. | 244/149 |
| 5,825,667 A | * 10/1998 | Van Den Broek | 702/141 |
| 5,881,974 A | * 3/1999 | Larsen et al. | 244/149 |
| 6,484,641 B2 | * 11/2002 | Carreiro | 102/489 |

FOREIGN PATENT DOCUMENTS

| | | |
|---|---|---|
| EP | 0281159 B1 | 7/1991 |
| EP | 0480733 B1 | 5/1995 |
| EP | 0838395 A2 | 4/1998 |
| EP | 0785130 B1 | 4/2002 |
| EP | 1084950 B1 | 5/2002 |

OTHER PUBLICATIONS
International Search Report.

* cited by examiner

*Primary Examiner*—Michael J. Carone
*Assistant Examiner*—Stephen A Holzen
(74) *Attorney, Agent, or Firm*—Burns, Doane, Swecker & Mathis

(57) ABSTRACT

A device for the automatic opening of a parachute, comprising a casing (1) closed with a lid (2), in which are located the means (3, 14) for electronically sensing the altitude of the parachute during the jump and the time and falling speed, and their controlling elements with a display unit and joint power supply, further comprising an activating unit consisting of an electrically controlled cutting explosive cartridge (12) with a through opening through which a ripcord (3) passes to release the securing string of the parachute, this explosive cartridge (12) being joined to said means by a connecting cable. The cutting explosive cartridge (12) is positioned in the interior space of the casing (1) formed by its partitions (4) and its connecting cable is led through the partition, while the casing (1), which together with the lid (2) consists of a body made of shock resistant material, is arranged for securing in the back part of the parachute harness.

3 Claims, 2 Drawing Sheets

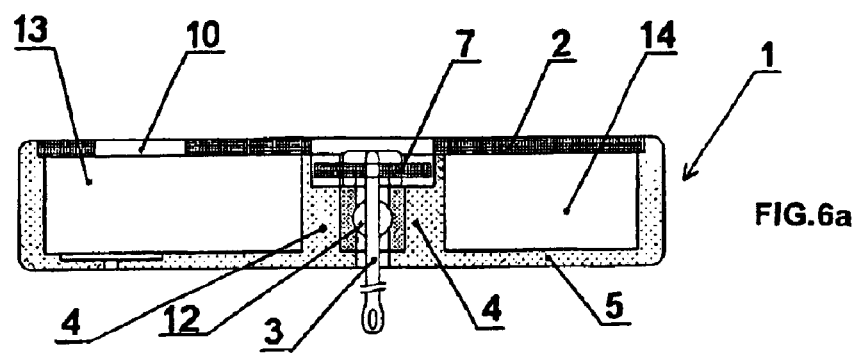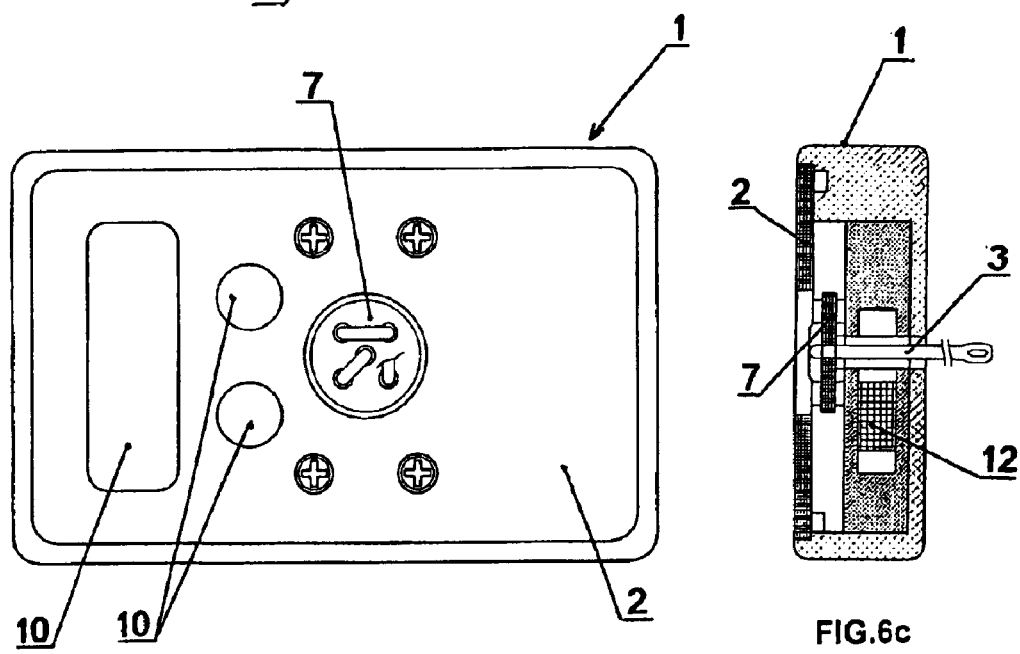

AUTOMATIC RELEASING DEVICE FOR A PARACHUTE

FIELD OF THE INVENTION

The invention concerns an automatic releasing device for a main or reserve parachute which is based on the principle of electronic sensing of the altitude of the parachute during the jump and the falling speed.

DESCRIPTION OF THE PRIOR ART

Accidental risk situations can arise during parachute jumping where the skydiver during free fall finds himself at a dangerously low altitude without the parachute opening. This problem was solved by the automatic opening of the main or reserve parachute. Known systems for automatic opening of the parachute are based on the principle of atmospheric pressure measurement in the course of the jump, where the altitude is determined by this value. To measure the pressure, older automatic parachute opening devices use mechanical membrane meters, aneroids, which are reliable. In recent times use has spread of equivalent pressure sensors on the electronic principle, for example semiconductor or piezoelectric sensors.

The processing of a signal from an aneroid was carried out by means of a mechanical device and to release the reserve or main parachute a spring was used whose thrust resulted in the release of the securing string of the parachute container. This mechanical device was very reliable, but fairly bulky and heavy, and moreover it was susceptible to vibration and mechanical shock. With the development of electronics and microelectronics it was possible gradually to replace mechanical with electronic devices which work on the same principle. The pressure is measured and the instant altitude and falling speed values are determined from the measured pressure values. The advantage of these electronic devices compared to the equivalent mechanical device lies in their smaller size and weight. Moreover the electronic device permits additional functions for more precise determination of the correct moment for emergency opening of the parachute.

The currently known electronic equipment consists of three basic parts which are connected by electric cables. In the basic unit there is the electric power supply, measuring and controlling electronic circuits as the case may be. A further part consists of the controlling unit (with a display unit and push-button, and possibly a light-emitting diode and switch) for turning the device on and off and adjusting its functions. Finally the third part is the activating unit, consisting of an electrically controlled cutting explosive cartridge, through which the releasing string of the parachute passes. A related disadvantage of all the current embodiments is the existence of connecting cables which reduce the reliability of the device and also increase the amount of space taken up in the parachute container. These embodiments are more demanding in terms of installation and operating stress. The known embodiments of the above mentioned devices, their principles and actual execution, are described in a series of patent files, for example U.S. Pat. Nos. 2,497,772, 3,023,498, 3,142,958, 3,300,606, 3,547,383, 3,813,066, 3,820,748, 4,792,903, 4,858,856, 5,024,400, European Patents Nos. 0281159, 0480733, 0838395, 0785130, 1084950 etc.

SUMMARY OF THE INVENTION

The technical solution concerns a device for the automatic opening of a parachute, comprising a casing closed with a lid, in which are located the means for electronically sensing the altitude of the parachute during the jump and the time and falling speed, and their controlling elements with a display unit and joint power supply, further comprising an activating unit consisting of an electrically controlled cutting explosive cartridge with a through opening through which a ripcord passes to release the securing string of the parachute, this explosive cartridge being joined to said means by a connecting cable.

The basis of this technical solution lies in the fact that the cutting explosive cartridge is positioned in the interior space of the casing formed by its partitions and its connecting cable is led through the partition, while the casing, which together with the lid consists of a body made of shock-resistant material, is arranged for securing in the back part of the parachute harness. The advantage is the smaller size and increased resistance to outside influences of the device for automatic opening of the reserve parachute, particularly to mechanical influences and also electromagnetic disturbance, and thereby an increase in its overall reliability.

The casing is preferably a flat metal box having in the central area two partitions running from the bottom up to the lid, which divides the inside of the casing into three areas arranged side by side. In one outer area there are located the means for electronically sensing the altitude of the parachute during the jump and the time and falling speed, and their controlling elements with a display unit, in the second outer area is the power supply, and in the area between them, in which is positioned the cutting explosive cartridge, there is an opening in the bottom for passage to the outside of the casing of the functional end of the ripcord for releasing the securing string of the parachute. In the recess of the two partitions there is a plate for fastening the other end of the ripcord for releasing the securing string of the parachute, spanning the area between the partitions above the cutting explosive cartridge. A passage for the connecting cable is formed by an upper slot in the end area of one of the two partitions, and in the opposite end area, where the two partitions are connected in a joint reinforcement, an upper through slot joining the two outer areas for guiding the feeder cable is formed in that reinforcement.

The device is small, very compact and mechanically resistant. There are no outer connecting cables. The power supply, which is replaceable, is arranged in a section of the casing separated from the section with the firmly installed controlling electronics. All the parts are enclosed in a solid metal (or plastic) casing, lodged in the back part of the parachute harness in a free space for the draw of the ripcord for releasing the securing string of the parachute. No part of the device is exposed to the direct effect of the surrounding environment. The casing of the device does not protrude into or out of the parachute container, the device is smoothly integrated into the harness and container and there is no practical possibility of negative interaction with any part of the main or reserve parachute, either during free fall, in the course of opening the parachute or during parachute fall or gliding.

The lid secured in the recess of the casing, in the region above the area with the means for electronically sensing the altitude of the parachute during the jump, the time and falling speed, has incisions for the display unit and the controlling push-buttons, and in the region above the plate for securing the other end of the ripcord for releasing the securing string of the parachute, it is furnished with a manipulation opening. After being inserted into the pocket in the back part of the parachute harness in the area for the passage of the ripcord to release the securing string of the parachute, this ripcord passes through the device. The pocket is transparent on the side of the display unit and of the controlling push-buttons of the device, to allow access to these elements. The device can also replace the metal or plastic plate in the back part of the parachute harness, against which rests the spring of the extracting parachute for the reserve parachute.

BRIEF DESCRIPTION OF THE DRAWINGS

The technical solution will be further explained with a concrete example of one of its possible embodiments, with the help of the attached drawings and the description that follows:

FIG. 6 shows the arrangement of the device, including the ripcord to release the securing string of the reserve parachute, in perspective, lengthwise and vertical section.

DETAILED DESCRIPTION OF THE PREFERRED EMBODIMENTS

Figure 1:
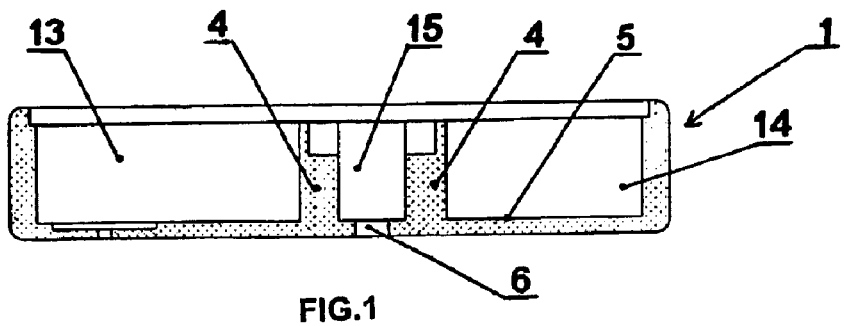
FIG. 1 illustrates the structural arrangement of the device in partial vertical lengthwise section.
Figure 2:
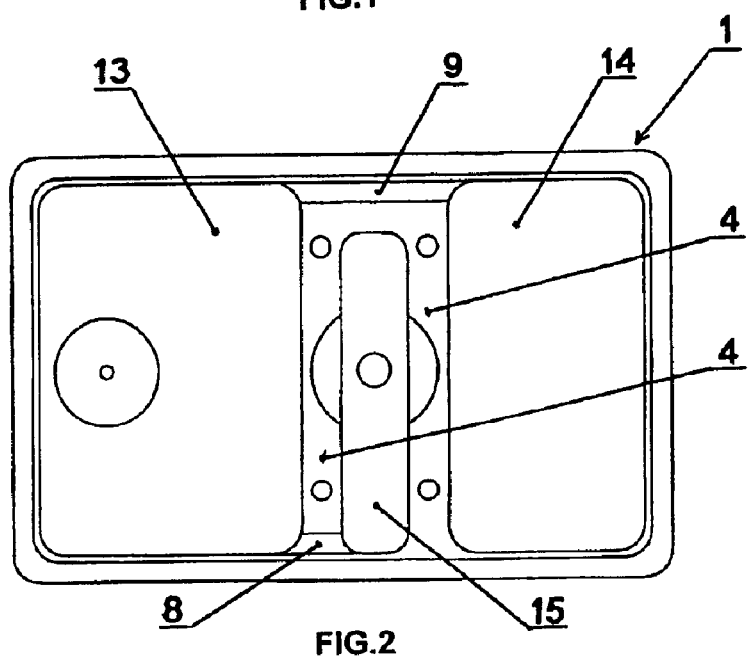
FIG. 2 shows a perspective view from above.
Figure 3:
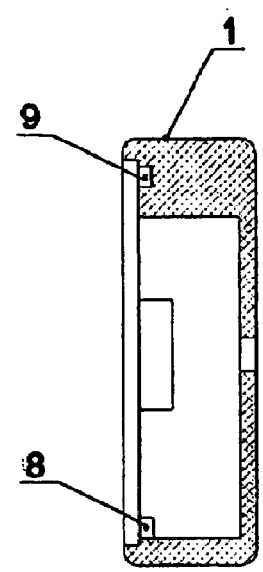
FIG. 3 shows a vertical transverse section in the area of the outlet for the ripcord to release the securing string of the reserve parachute.
Figure 4:
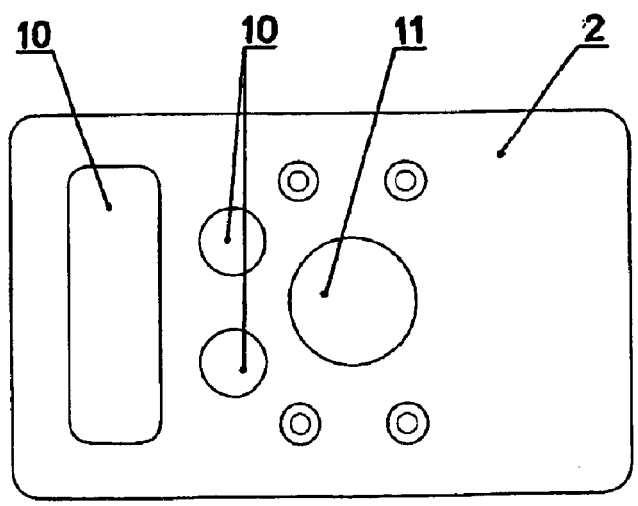
FIG. 4 illustrates the covering lid of the device in perspective view.
Figure 5:
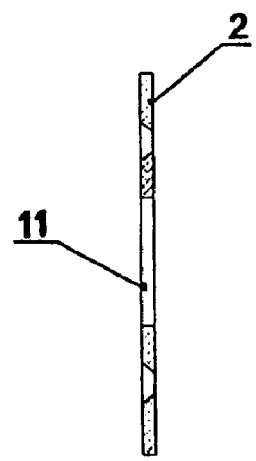
FIG. 5 shows this covering lid in transverse section.

The automatic releasing device for a parachute is structurally formed as a flat metal box made of a light aluminium alloy, having in the central area two thick-walled partitions 4 running from the bottom 5 up to the lid 2, which divides the inside of the casing 1 of the box into three areas or sections arranged side by side. In one outer area, the first section 13 of the casing 1, there is a securely installed electronic control device. This comprises a single-chip controller, a circuit for controlling a minimum consumption of power from the power supply device (replaceable battery), an electronic pressure sensor, a real time clock, a memory and push-buttons for the keyboard and display unit. The electronic pressure sensor serves to measure the instant values of atmospheric pressure in the locality and in the course of the jump. During free fall and parachute gliding, the instant atmospheric pressure value is mathematically converted into an instant altitude value. From the time difference of the instant altitude values, the speed of the fall is automatically calculated. If this speed exceeds the limit value under the critical height, the release mechanism of the ripcord for releasing the securing string of the parachute is activated and the parachute opens automatically. The real time clock serves to measure the time intervals. It is constantly working, even if the device is switched off. This clock calculates the time from when the device is put into operation and resets only during disconnection of the power supply (battery). It gives a warning on the lifespan of the battery, automatically checks the switching on and off of the device and ensures the periodic exact reading by the sensor of the atmospheric pressure. All the measured values are continuously recorded in the memory of the device, in such a way that the oldest values are always replaced. In the case of activation, it is possible to use those values that are stored for retrospective analysis of a situation that has arisen. The number of actual jumps, the altitude of the jump, the altitude at which the parachute opened, the falling speed and other values are also recorded in the memory. By means of the keyboard push-buttons, it is possible to bring up all of the data onto the display unit. It is also possible to switch the device on and off by means of the keyboard, or to change the parameters for performance of the device as the case may be.

In the second outer area, the second section 14 of the casing 1, there is the replaceable power supply for the device, the batteries. The output from these batteries is conveyed by the power cable located in the upper through slot 9 in the adjacent end area of the joint reinforcement of the two partitions 4 of the casing 1, to the electronic control device in the first section 13 of the casing 1.

The cutting explosive cartridge 12 is positioned in the third section 15 in the area between the two outer sections 13 and 14. This third section 15 has an opening 6 in the bottom 5 for the passage of the functional end of the release of the securing string of the parachute, in the recess of the two partitions 4 defining the width of the third section A, there is a plate 7 for fastening the other end of the ripcord 3 for releasing the securing string of the parachute, spanning the area between the partitions 4 above the cutting explosive cartridge 12. A passage for the connecting cable from the electronic control to the cutting explosive cartridge 12 is formed by an upper slot 8 in the end area of the partitions 4 between the first 13 and third section 15 of the casing 1. The release of the securing string of the parachute can be used once only. In case of activation it must be changed for a new one. Activation is carried out electronically by means of the built-in cutting explosive cartridge 12.

Secured in the recess of the casing 1 there is a lid 2 made of a light aluminium alloy which, in the region above the first section 13 with the electronic control, has incisions 10 for the display unit and the controlling push-buttons of the keyboard.

In the region above the plate 7 for securing the other end of the ripcord 3 for releasing the securing string of the parachute, above the third section 15 of the casing 1, the lid 2 has a manipulation opening 11.

The casing 1 together with the lid 2 consists of a body made of shock-resistant material. It is arranged for securing in the back part of the parachute harness. After being inserted into the pocket in the back part of the parachute harness in the area for the passage of the ripcord 3 to release the securing string of the parachute, this ripcord 3 passes through the device. The pocket is transparent on the side of the display unit and of the controlling push-buttons of the device, to allow access to these elements. The device can also replace the metal or plastic plate in the back part of the parachute harness, against which rests the spring of the extracting parachute for the reserve parachute.

The device according to this solution is integrated into the parachute harness and container, so that there is practically no possibility of negative interaction with any part of the main or reserve parachute, either during free fall, in the course of opening the parachute or during parachute fall or gliding.

What is claimed is:

1. A device for the automatic opening of a parachute, comprising:

a casing closed with a lid, in which are located the means for electronically sensing the altitude of the parachute during the jump and the time and falling speed, and their controlling elements with a display unit and joint power supply, further comprising an activating unit consisting of an electrically controlled cutting explosive cartridge with a through opening through which a ripcord passes to release a securing string of the parachute, this explosive cartridge being joined to said means by a connecting cable, wherein the cutting explosive cartridge is positioned in the interior space of the casing formed by at least one partition and the connecting cable is led through the at least one partition, while the casing, which together with the lid consists of a body made of shock-resistant material, is arranged for securing in the back part of a parachute harness.

2. A device according to claim 1, wherein the casing is a flat metal box having in a central area two partitions running from the bottom up to the lid, which divides the inside of the casing into three areas arranged side by side, where in one outer area there are located the means for electronically sensing the altitude of the parachute during the jump and the time and falling speed, and their controlling elements with a display unit, in the second outer area is the power supply, and in the area between them, in which is positioned the cutting explosive cartridge, there is an opening in the bottom for passage to the outside of the casing of a functional end of the ripcord for releasing the securing string of the parachute, and where in a recess of the two partitions there is a plate for fastening the other end of the ripcord for releasing the securing string of the parachute, spanning the area between the partitions above the cutting explosive cartridge, where a passage for the connecting cable is formed by an upper slot in the end area of one of the two partitions, and in the opposite end area, where the two partitions are connected in a joint reinforcement, an upper through slot joining the two outer areas for guiding a feeder cable is formed in that reinforcement.

3. A device according to claim 2, wherein the lid secured in the recess of the casing, in the region above the area with the means for electronically sensing the altitude of the parachute during the jump, the time and falling speed, has incisions for the display unit and the controlling push-buttons, and in the region above the plate for securing the other end of the ripcord for releasing the securing string of the parachute, a manipulation opening is furnished.

* * * * *